United States Patent
Vagedes

(10) Patent No.: US 6,825,414 B2
(45) Date of Patent: *Nov. 30, 2004

(54) EXTERIOR MOUNTING BLOCK FOR ELECTRICAL FIXTURES

(75) Inventor: Michael Vagedes, Florence, KY (US)

(73) Assignee: Bluegrass Products, L.L.C.

( * ) Notice: Subject to any disclaimer, the term of this patent is extended or adjusted under 35 U.S.C. 154(b) by 0 days.

This patent is subject to a terminal disclaimer.

(21) Appl. No.: 10/658,546

(22) Filed: Sep. 10, 2003

(65) Prior Publication Data

US 2004/0112622 A1 Jun. 17, 2004

Related U.S. Application Data

(63) Continuation-in-part of application No. 10/253,351, filed on Sep. 24, 2002, now Pat. No. 6,723,921.

(51) Int. Cl.⁷ .................................................. H01R 4/00
(52) U.S. Cl. ............................ 174/58; 174/54; 174/61; 220/3.2; 248/906; 439/535
(58) Field of Search .............................. 174/58, 61, 63, 174/54; 248/906; 439/535; 220/3.2, 3.7, 3.8, 3.92

(56) References Cited

U.S. PATENT DOCUMENTS

| | | |
|---|---|---|
| 3,895,732 A | 7/1975 | Robinson et al. |
| 3,906,145 A | 9/1975 | Carmichael |
| 4,036,389 A | 7/1977 | Pate et al. |
| 4,226,393 A | 10/1980 | Rardin et al. |
| 4,323,723 A | 4/1982 | Fork et al. |
| 4,327,841 A | 5/1982 | Wimberly |
| 4,666,055 A * | 5/1987 | Lewis ........................ 220/3.2 |
| 4,726,152 A | 2/1988 | Vagedes et al. |
| 4,854,093 A | 8/1989 | Kellom |
| 4,875,318 A | 10/1989 | MacLeod et al. |
| 4,920,708 A | 5/1990 | MacLeod et al. |
| 5,000,409 A | 3/1991 | MacLeod et al. |
| 5,133,165 A | 7/1992 | Wimberly |
| 5,221,814 A | 6/1993 | Colbaugh et al. ............. 174/68 |
| D343,825 S | 2/1994 | Enderby |
| 5,326,060 A | 7/1994 | Chubb et al. |
| 5,486,650 A | 1/1996 | Yetter |
| 5,549,266 A | 8/1996 | Mitchell et al. |
| 5,577,702 A | 11/1996 | Chubb et al. |
| 5,578,791 A | 11/1996 | Bosse, Jr. |
| 5,598,670 A | 2/1997 | Humphrey et al. |
| 5,722,208 A | 3/1998 | Humphrey et al. |
| 5,775,032 A | 7/1998 | Lacy |
| 5,804,764 A | 9/1998 | Gretz |
| 5,920,033 A | 7/1999 | Bosse, Jr. |
| 5,952,610 A | 9/1999 | Bosse, Jr. |
| 5,965,844 A | 10/1999 | Lippa ......................... 174/49 |
| 6,051,786 A | 4/2000 | Gretz |
| 6,112,927 A | 9/2000 | Gretz |
| 6,133,524 A | 10/2000 | Bosse, Jr. |
| 6,141,922 A | 11/2000 | Carlisle et al. |
| 6,188,022 B1 | 2/2001 | He .............................. 174/58 |
| 6,239,368 B1 | 5/2001 | Gretz |
| 6,268,563 B1 | 7/2001 | Gretz |
| 6,303,858 B1 | 10/2001 | Bosse, Jr. |
| 6,310,287 B1 | 10/2001 | Schiedegger et al. |
| 6,323,424 B1 | 11/2001 | He .............................. 174/58 |
| 6,355,882 B1 | 3/2002 | Gretz |
| 6,359,220 B2 | 3/2002 | Schiedegger et al. |
| 6,417,447 B1 | 7/2002 | Bosse, Jr. |
| 6,429,371 B2 | 8/2002 | Schiedegger et al. |

* cited by examiner

Primary Examiner—Dhiru R Patel
(74) Attorney, Agent, or Firm—Wood, Herron & Evans, L.L.P.

(57) ABSTRACT

An exterior mounting block for electrical fixtures includes a plastic block having a nailing flange and screw holes adapted to support either a duplex outlet or a light fixture. The holes are spaced either along the central axis of the block for a duplex, or spaced diagonally relative to each other on sidewalls to support a light fixture. The block is formed from a white, fire-resistant material and includes a cover plate formed from a non-fire-resistant material or from a metal material.

11 Claims, 4 Drawing Sheets

EXTERIOR MOUNTING BLOCK FOR ELECTRICAL FIXTURES

RELATED APPLICATION

This application is a continuation-in-part application of U.S. application Ser. No. 10/253,351, filed Sep. 24, 2002 now U.S. Pat. No. 6,723,921, entitled EXTERIOR MOUNTING BLOCK FOR ELECTRICAL FIXTURES, the disclosure of which is incorporated in its entirety herein by reference.

BACKGROUND

The use of lapped siding, i.e., vinyl, aluminum, etc., on buildings increases the difficulty of mounting electrical fixtures such as light fixtures, electrical outlets and the like to the sides of buildings. A product was developed which provided a mounting surface for the electrical fixture and was easily integrated into siding. This device is disclosed in Vagedes et al., U.S. Pat. No. 4,726,152. This is mounted to the side of a building with or without the use of an electrical box. The problem with this mounting block and similar blocks is that it is not fire resistant. To be fire resistant, a mounting block must be made from a fire resistant plastic and further there must be an electric box attached to the rear surface of a mounting block. Generally mounting blocks are not deep enough for a standard electric box.

Making the mounting block itself fire resistant significantly increases the cost of the product. One attempted solution to this problem is disclosed in U.S. Pat. No. 6,359,220 which uses a mounting block that has an electrical box that snap fits into the opening. The electrical box made from fire resistant material is attached directly to the electrical fixture. In order to facilitate electrical wires and electrical outlets, the box needs to be significantly deeper making the mounting block somewhat unsightly.

Plastic mounting blocks generally match the color of the siding. Siding comes in a wide variety of colors. Thus, stocking mounting blocks which match all siding colors is very expensive. Further, fire resistant material is not available in all colors.

Another issue is mounting of electrical fixtures either lights or outlets. Both of these are attached with two screws. But, the screw hole spacing for outlets is not the same as the spacing for light fixtures.

SUMMARY OF THE INVENTION

The present invention is premised on the realization that a fire resistant mounting structure for an exterior electrical fixture can be formed from a mounting block having a flange, a front wall and four side walls. A standard opening is provided in the front wall. The interior of the mounting block holds a separate fire resistant electric box that has an opening substantially larger than the opening on the front surface of the mounting block. Interposed between the electric box and the mounting block is a separate fire resistant plate which restricts the opening on the electric box making it correspond in size to the opening in the mounting block. The interposed plate and the electric box are formed from fire resistant material. This combined structure is fire resistant. At the same time this provides more than adequate room for electrical wiring and/or an electrical outlet. The electric box can include four supports that extend from each corner. These supports locate the box and plate in the mounting block.

Preferably the structure includes a peripheral ring that snaps on to conceal the cut edges of siding.

Further, in a preferred embodiment, the structure includes a plate which mounts onto the front surface and covers the front surface as well as the peripheral ring. If the plate is metal, it makes the mounting appear to be metal such as brass or the like. Plastic plates can be used to match the color of the siding. Thus, only one color mounting block is required and less expensive cover plates can be used to match the siding color. Alternatively, the entire block can be formed from fire resistant material, generally in white. This eliminates the need for a plate on the electrical box. The color can be changed by use of a colored cover either with or without a ring. The cover does not need to be fire resistant.

Preferably, the electrical box includes two sets of holes. The first set is adapted to accept an outlet. The second set, fixed diagonally, accepts a light fixture.

The objects and advantages of the present invention will be further appreciated in light of the following detailed description and drawings in which:

DETAILED DESCRIPTION

Figure 1:
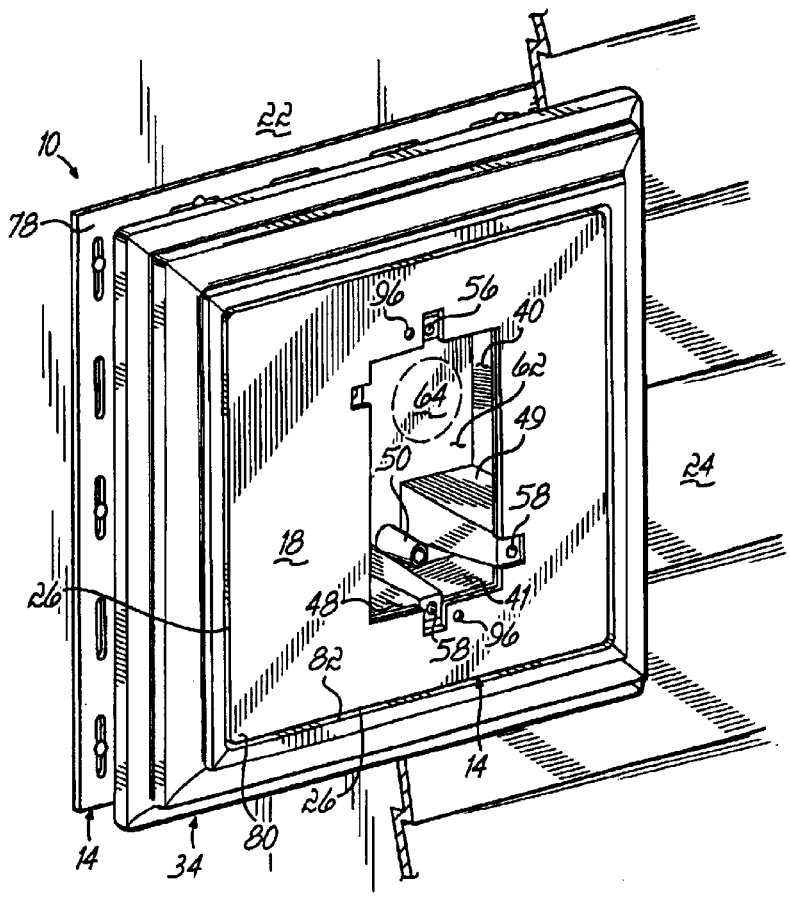
FIG. 1 is a perspective view of the structure of the present invention partially broken away.
Figure 3:
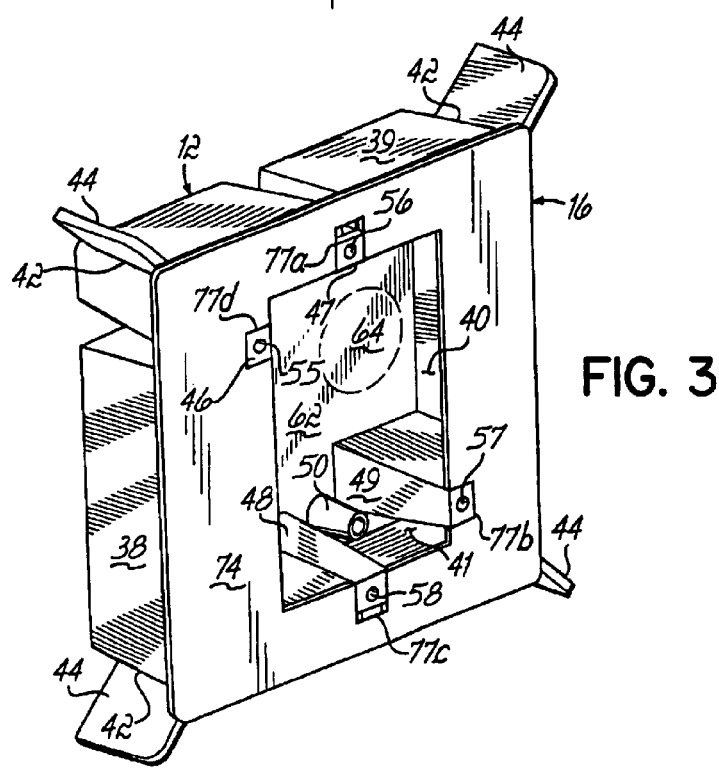
FIG. 3 is a perspective view of the electrical box and interposed plate.
Figure 2:
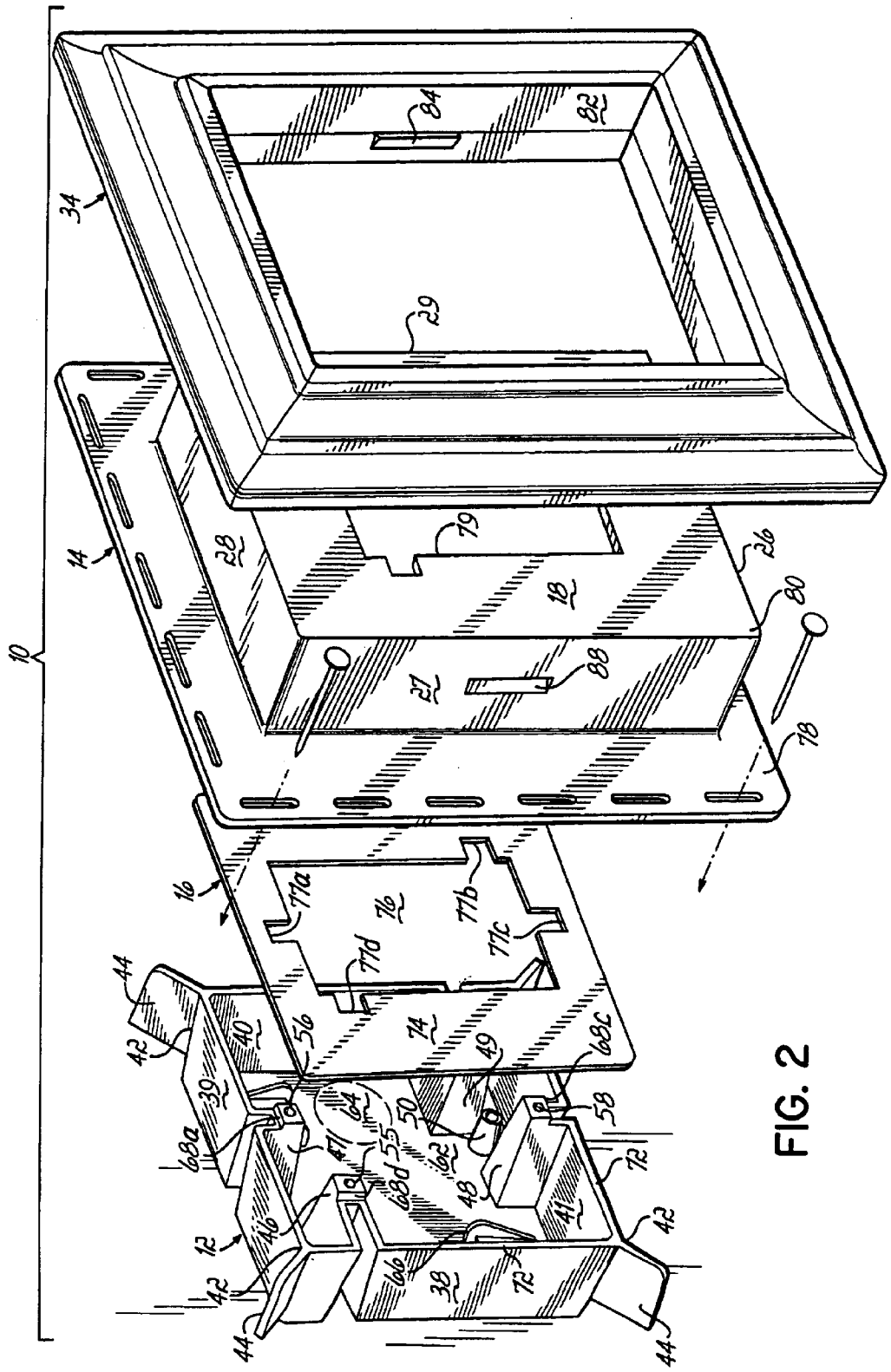
FIG. 2 is an exploded view of the FIG. 1.
Figure 4:
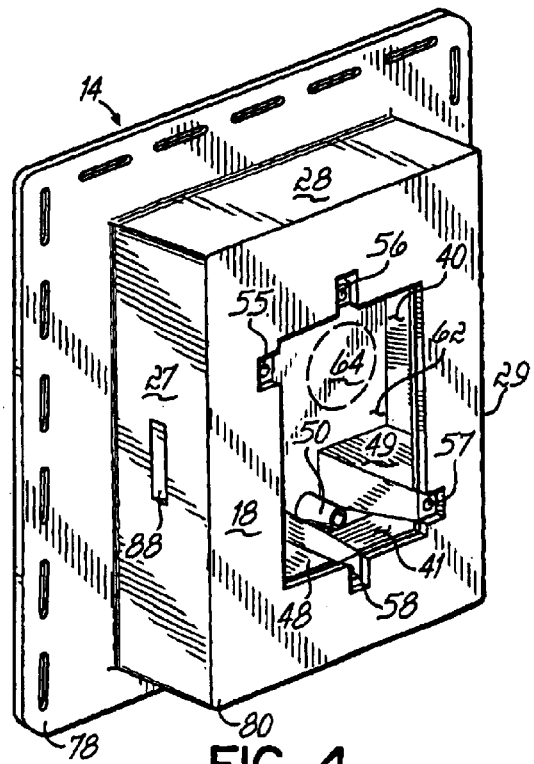
FIG. 4 is a perspective view of the mounting box covering the interposed plate and the electrical box.

As shown in FIGS. 1 and 2, the present invention is a mounting structure 10 for an electrical light fixture, electric outlet or the like (not shown). The mounting structure includes an innermost electric box 12 which is covered by a mounting block 14. A cover plate 16 is interposed between the electric box 12 and a front wall 18 of the mounting block 14. This combined structure is attached to a wall 22 of a building as shown in FIG. 1 with siding 24 abutting the side walls 26, 27, 28 and 29 of mounting block 14.

Figure 5:
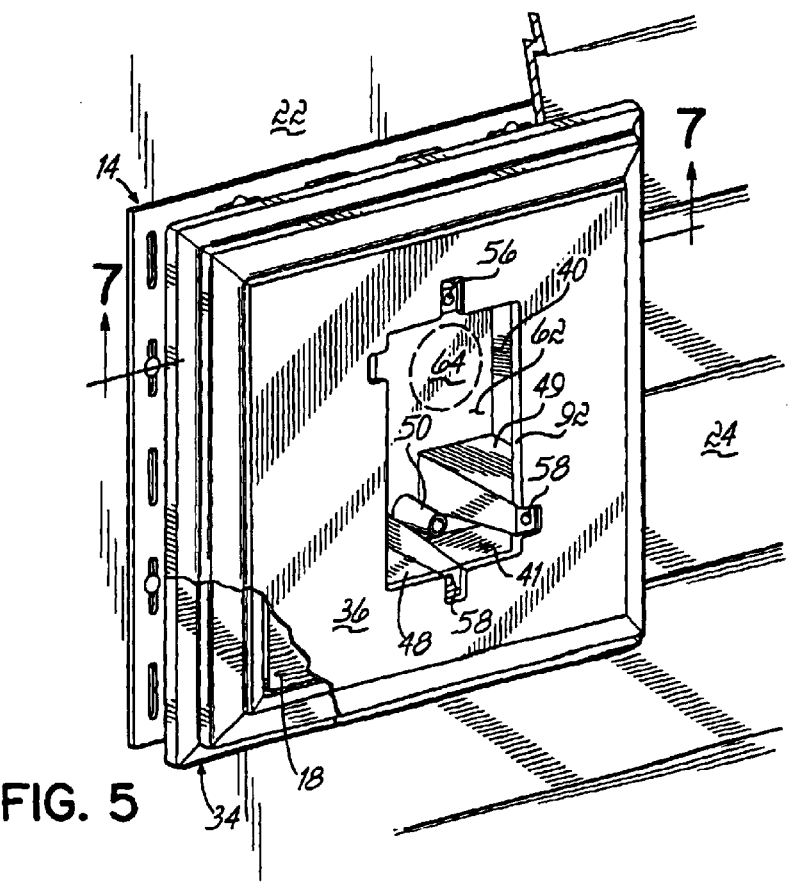
FIG. 5 is a perspective view partially broken away depicting a cover plate covering the structure of the present invention.
Figure 6:
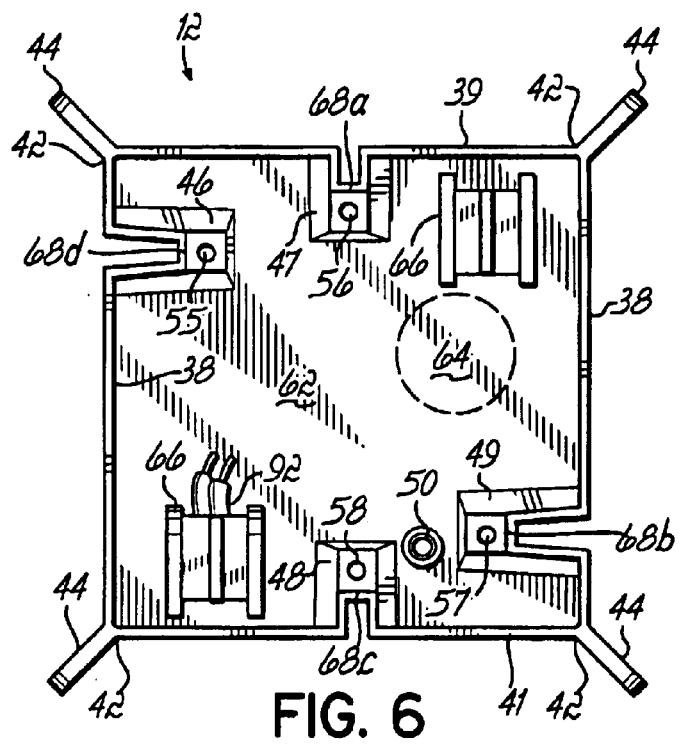
FIG. 6 is a plan view of the electric box used in the present invention.

The edges of the siding are then in turn covered with an exterior snap-on ring 34. The entire structure 10 can in turn be covered by a plate 36 as shown in FIG. 5.

More particularly, the electric box includes four side walls 38, 39, 40 and 41, locating supports 44 extended tangentially from each corner 42. Inwardly extended portions 46, 47, 48, 49 from the side walls support screw holes 55, 56, 57, 58. These four screw holes in the electrical box 12 are positioned so that they can facilitate mounting of either an electrical light fixture with holes 55 and 57 diagonally spaced at 3.5"±0.25" (center to center) or an electrical duplex outlet with vertically spaced holes 56 and 58 spaced at 3.25"±0.25" (center to center). Holes 56 and 58 are located on first opposite sides 39 and 41 and holes 55 and 57 are located on second opposites 38 and 40. Holes 56 and 58 are located along what is the central axis of block 14. Preferably, the diameter of holes 55 and 57 is slightly larger than the diameter of holes 56 and 58. A light fixture is usually mounted with number 8 screws. A duplex outlet is attached with number 6 screws.

Back wall 62 of the box includes a punch out 64 for a mechanical wire fastener or alternately a fastening tab 66 to receive electric cable such as Romex brand cable. Each of the inwardly extended portions 46-49 includes a boss 68(*a*), (*b*), (*c*), (*d*) which extend slightly above the forward edge 72 of the electric box 12. This extends roughly the thickness of plate 16 and therefore is flush with the forward surface 74 of plate 16 when assembled with plate 16 resting on edge 72 of box 12. Electric box 12 also includes a boss 50 designed to receive a ground screw.

Plate 16 is sized to cover electric box 12. Plate 16 further includes a standard sized, non-square, rectangular opening 76 generally 2" by 3½" and also includes four cut out portions 77*a, b, c, d* adapted to receive the bosses 68 of the extended portions 46-49. Plate 16 is simply positioned over the electric box 12 completely covering the opening of the box 12. This forms a complete fire resistant electric box. Cut out portions 77*a* and 77*c* are larger than bosses 68*a* and 68*d* providing an open area aligned with open areas in box 12. This provides clearance for mounting screws for light fixtures and GFI coverplates. The front wall of block 14 has corresponding openings.

The mounting block 14 in turn has a peripheral flange 78, extended from side walls 26-29. Front wall 18 includes an opening 79 corresponding in size and shape to the opening 76 in plate 16. This opening should be about equal to or larger than the opening in plate 16. The four supports 44 of the electric box 12 engage the internal surface of the four corners 80 of block 14 aligning all these elements and provide a wedge fit.

Ring 34 which snap fits over block 14 has an internal surface 82 corresponding to the four walls 27-30 of the mounting block 14. It includes first and second tabs 84 (only left side showing) which are adapted to snap into first and second indentations 88, 90 in the side walls 27 and 29 of the mounting block 14. This ring 34 simply covers the exterior edges of siding once the unit 10 is installed.

To install the unit of the present invention, a wire 92 is attached to the electric box 12 either through the opening at tab 66 or with an electrical connector through knockout 64. The plate 16 is then placed over the electric box 12 and the mounting block 14 is placed over the combined electric box 12 and plate 16. The supports 44 will properly locate the box 12 within the mounting block 14 to center the screw holes 58 in the box 12 with the openings 77 in plate 16 in the front wall 18 of the mounting block 14. The wall flange of block 14 is nailed to the exterior wall 22 of a building. This holds the electric box 12 and plate 16 compressed between the wall 22 and front wall 18 of block 14. Siding 24 is attached to the building abutting the four walls of the mounting block 14. Ring 34 is snap fitted onto the side walls 27 and 30 of the mounting block 14. The top of ring 34 is flush with the front wall 18 of the mounting block 14.

An electrical fixture (not shown) can then be attached to the wire 92 in the electric box 12 and screwed onto box 12 using holes 56 and 58 or 55 and 57. Depending on the type of fixture, the open area above and below mounting holes 56 and 58 will provide clearance for fixture mounting screws. This combination of two sets of holes and the open areas above and below holes 56 and 58 permits most light fixtures, switches and outlets to be mounted.

Figure 7:
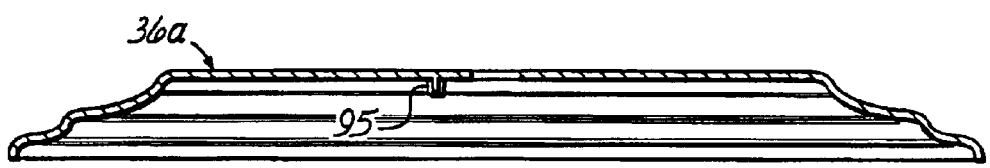
FIG. 7 is a cross-sectional view of the cover plate taken at lines 7—7 of FIG. 5.

A cover plate 36 can be employed to cover the entire mounting structure 10 positioned between structure 10 and the electric fixture and provide a unique appearance. As shown in FIG. 5, plate 36 covers the entire front surface of wall 18 and extends beyond the edge of the mounting block 12 and the ring 34. As shown in FIG. 7, plate 36 includes cross shaped bosses 95 or tabs if the plate is metal. These bosses fit into holes 96 in the surface 18 of block 14 and provide an interference fit to temporarily hold the plate 36 in place and act as a centering mechanism to center the opening in the plate with the opening in the box. An electrical fixture is attached to the box by screws or bolts extending from the electrical fixture into the screw holes 56 and 58 or 55 and 57 and hold the plate in position. The plate can also be centered by its lower surface corresponding in size and shape to the ring 34. These can provide an interference fit to temporarily hold the plate 36 in place until the outlet or fixture is attached. The length of bosses 95, are about the same as the thickness of wall 18.

This cover plate 36 can be used with or without the ring 34 and can be used with any plastic mounting block as long as the plate has a dimension which extends beyond the side walls of the mounting block 12. Thus, it can be used to retrofit existing mounting blocks. Plate 36 can be plastic, metal, or metal coated plastic. Further, it can be square rectangular or oval, i.e., nonrectangular. It can be significantly larger than the block and used to mount a coach fixture, i.e., where the fixture is larger than the block.

As indicated, the electric box 12 and plate 16 are preferably made from a fire resistant plastic or metal suitable for an exterior building. Their color is not relevant as they will be totally concealed by the mounting block 14 and any electrical fixture. The block 14 and ring 34 can then be formed from a different non-fire rated plastic. This reduces the cost of structure 10 while maintaining overall fire resistance. The color of the block 14 and ring 34 should match or accent the siding 24.

The present invention provides a mounting structure for an electrical fixture which is fire resistant whereas the mounting block 14 itself does not need to be made from fire resistant material. The inner electrical box 12 and intermediate plate 16 provides the fire resistant structure. Changing the color of the block will not affect the fire rating of the product. This encases the electrical wiring within a fire resistant structure making it compliant with current electrical codes. Further, due to the use of the intermediate plate, an electrical box can be molded or stamped to provide a large space for wiring without the need for an unsightly deep mounting block. The permanent locating supports on the mounting box ensure that when it is assembled, the opening in the electrical box is properly located within the mounting block and further facilitates quick assembly of the structure. Finally, the metal plate that can be attached to the exterior surface providing a truly unique appearance for the mounting block.

If the block 14 is made from a fire resistant material, plate 16 is not required. Further, the color can be changed by using plastic cover plate 36 which has the desired color and which does not need to be fire resistant.

This has been a description of the present invention along with the preferred method of practicing the invention, however, the invention itself should only be defined by the appended claims wherein

I claim:

1. A structure for mounting an electrical fixture comprising a plastic mounting block having a peripheral nailing flange, four side walls extending from said peripheral flange and a front wall having a peripheral edge and a first opening adapted to provide a wire connection between an electrical fixture and wiring within a building;

a plate covering said front wall of said mounting block said plate extending beyond the peripheral edge of said front wall and having a second opening aligned with said first opening in said front wall.

2. The structure claimed in claim 1 wherein said plate and said block are formed from different materials.

3. The structure claimed in claim 2 wherein said block is formed from a white plastic and said plate is formed from a non white plastic.

4. The structure claimed in claim 3 wherein said block is formed from a fire resistant material.

5. The structure claims in claim 2 wherein said plate is metal.

6. The structure claimed in claim 1 wherein said plate is nonrectangular.

7. The structure claimed in claim 1 further comprising a mechanism to center said second opening with said first opening.

8. A mounting block for the exterior of a building having mounting surfaces; an opening through said mounting surfaces having a first and second set of opposite sides, and a front wall; a first pair of cut out portions on said front wall and having a distance between each other and said first pair of cutout portions aligned along a central axis of said block; a second pair of cutout portions on said front wall, said second pair of cut out portions having a second distance between each other and positioned diagonally from each other; wherein said first distance is different than said second distance and said pairs of cut out portions are designed to permit mounting of different electrical structures.

9. The mounting block claimed in claim 8 wherein said opening is a non square rectangle.

10. The mounting block claimed in claim 8 wherein said first set of holes are 3.25"±0.25 inch apart and said second set of holes are 3.5"±0.25" apart.

11. The mounting block claimed in claim 8 wherein said second set of holes each has a larger diameter than a diameter of each of said first set of holes.

* * * * *